United States Patent
Leung

(10) Patent No.: US 9,351,530 B2
(45) Date of Patent: May 31, 2016

(54) WARM CAP WITH SECURITY FEATURES

(71) Applicant: Yee Chong Leung, Shatin (HK)

(72) Inventor: Yee Chong Leung, Shatin (HK)

(*) Notice: Subject to any disclaimer, the term of this patent is extended or adjusted under 35 U.S.C. 154(b) by 0 days.

(21) Appl. No.: 14/993,937

(22) Filed: Jan. 12, 2016

(65) Prior Publication Data
US 2016/0120149 A1 May 5, 2016

Related U.S. Application Data

(63) Continuation of application No. 14/475,448, filed on Sep. 2, 2014, now Pat. No. 9,277,779.

(51) Int. Cl.
*A01K 15/02* (2006.01)
*A42B 3/04* (2006.01)

(52) U.S. Cl.
CPC ............... *A42B 3/042* (2013.01); *A01K 15/021* (2013.01)

(58) Field of Classification Search
CPC ........ A42B 1/245; A42B 1/006; A42B 1/242; G02B 23/125
USPC ..................... 119/712, 174, 836; 2/10, 209.13
See application file for complete search history.

(56) References Cited

U.S. PATENT DOCUMENTS

| | | | | | |
|---|---|---|---|---|---|
| 5,634,201 | A * | 5/1997 | Mooring | ................ | A42B 1/245 2/12 |
| 6,240,568 | B1 * | 6/2001 | Lee | ........................ | A41D 27/08 2/195.1 |
| 8,467,133 | B2 * | 6/2013 | Miller | .................. | G02B 27/017 353/28 |
| 8,964,298 | B2 * | 2/2015 | Haddick | ................. | G06F 3/013 359/630 |
| 9,101,279 | B2 * | 8/2015 | Ritchey | .................. | G03B 37/00 |
| 9,215,362 | B2 * | 12/2015 | Mizuta | ............... | H04N 5/23203 |
| 2009/0158501 | A1 * | 6/2009 | Lowe | ..................... | A42B 1/245 2/209.13 |
| 2009/0260134 | A1 * | 10/2009 | Wittmann-Price | ..... | A42B 1/245 2/423 |
| 2010/0031424 | A1 * | 2/2010 | Sharpe | .................. | A42B 1/248 2/209.11 |
| 2010/0313334 | A1 * | 12/2010 | Moy | ...................... | A42B 1/248 2/209.13 |
| 2011/0145978 | A1 * | 6/2011 | Harbin | .................. | A61B 19/26 2/209.13 |
| 2011/0214082 | A1 * | 9/2011 | Osterhout | ............ | G02B 27/017 715/773 |
| 2013/0074245 | A1 * | 3/2013 | Cardi | ..................... | A42B 1/006 2/172 |
| 2013/0111651 | A1 * | 5/2013 | Waters | .................. | A42B 1/004 2/209.13 |
| 2014/0047616 | A1 * | 2/2014 | Lee | ......................... | A42B 1/245 2/209.13 |
| 2014/0109294 | A1 * | 4/2014 | Jacobs | ................... | A42B 1/245 2/209.13 |
| 2014/0304891 | A1 * | 10/2014 | Waters | ..................... | A42B 1/24 2/209.13 |
| 2015/0309316 | A1 * | 10/2015 | Osterhout | ............... | G06F 1/163 345/8 |

* cited by examiner

*Primary Examiner* — Yvonne Abbott-Lewis

(57) ABSTRACT

According to embodiments of the disclosed technology, systems, methods and devices are provided for wholly or partially obscuring the vision of a pet electronically using a cap worn on the head of the pet. In one embodiment, the cap has a screen or lens disposed proximate to the pet's eyes. The screen is capable of identifying an object or living thing that may be threatened by the pet, and wholly or partially obscuring the object from the vision of the pet to prevent the pet from being able to see and/or attack the object. An additional safety measure of the cap may be to completely darken or whiten the vision of the pet such that the pet is temporarily impaired from seeing anything. Still further, audio may also be used to distract or draw the pet's attention away the from target object.

15 Claims, 3 Drawing Sheets

WARM CAP WITH SECURITY FEATURES

CROSS-REFERENCE TO RELATED APPLICATIONS

This application is a continuation of application Ser. No. 14/475,448, filed Sep. 2, 2014.

FIELD OF THE INVENTION

This invention generally relates to caps for pets. Specifically, this invention relates to allowing users to communicate each other via devices, and to using a cap to provide warming capability to a pet and using the cap to control the pet's aggressive behavior.

BACKGROUND OF THE INVENTION

Garments worn by living organism, such as pets and humans are popular. For example, caps for cats and dogs are very common. The purpose of having pets wear caps seems obvious. That is, to keep them warm, especially during the winter. On the other hand, there are caps available in the market that seeks to give some protection to the heads of the pets wearing them. Thus, some caps serve dual purposes.

However, there are hardly any caps that come with security features that prevent these living things from getting aggressive to the point that the aggressive behavior may pose threats to human beings or other living things. These combined features have not yet been offered in the pet product market. Therefore, in view of the foregoing, it would be highly beneficial to the pet product industry to have high tech caps for pets which serve as a humane visual muzzle for protecting humans from sudden attacks by pets.

Therefore, it is an objective of the disclosed technology to provide an interactive cap to be worn by a pet which electronically manipulates what a pet can and can't see.

SUMMARY OF THE INVENTION

According to embodiments of the invention, systems, methods and devices are provided for wholly or partially obscuring the vision of a pet electronically using a cap worn on the head of the pet. In one embodiment, the cap has a screen or lens disposed proximate to the pet's eyes. The screen is capable of identifying an object or living thing that may be threatened by the pet, and wholly or partially obscuring the object from the vision of the pet to prevent the pet from being able to see and/or attack the object. An additional safety measure of the cap may be to completely darken or whiten the vision of the pet such that the pet is temporarily impaired from seeing anything.

In an embodiment of the disclosed invention, a garment is used for keeping head temperature warm while providing security features. A "garment", for purposes of this specification, is defined as any accessory or article of attire that may be donned or worn on the head and/or the face. The garment may have one or more of the following components: a) a cap adapted to change a temperature of a living thing wearing the cap; b) a screen disposed within the cap; c) an audio device disposed on or in the cap; and/or d) a smart chip in the cap.

The screen may display imagery located in a viewable periphery of the living thing wearing the cap. The screen may also darken a target object displayed on the screen such that the target object is not clearly visible on the screen, wherein the target object is an object under threat of attack by the living thing. The audio device may produce sound to direct the living thing in a direction away from the target object.

The smart chip may be a processor, such as a processor used in a computing device. The smart chip may be configured to perform the following functions/steps, not necessarily in the following order: a) capture the viewable periphery of the living thing using a camera; b) determine whether the living thing intends to aggressively pursue the target object by tracking movement of the living thing and monitoring any sudden change of speed and direction of the living thing; c) darken the target object and display the darkened target object on the screen; and/or d) verify if the living thing is successfully precluded from attacking the target object by measuring movement of the living thing after darkening the target object on the screen.

The smart chip may also carry out one or more contingency functions, which are contingent upon the living thing's behavior. For example, if the living thing continues to pursue the target object, highlight other objects that are distant from the target object to further distract to the living thing. If the living thing still continues to pursue the target object, produce sound to direct the living thing away from the target object.

In a further embodiment of the disclosed technology, the smart chip may facilitate one or more of the following additional functions, not necessarily in the following order: a) blackening the entire screen of the cap to prevent the living thing from seeing anything; b) whitening the entire screen of the cap to prevent the living thing from seeing anything; and/or c) cooling down the living object by turning down the temperature of the material of the cap.

In accordance with these and other objects which will become apparent hereinafter, the invention will now be described with particular reference to the drawings.

DETAILED DESCRIPTION

According to embodiments of the invention, systems, methods and devices are provided for wholly or partially obscuring the vision of a pet electronically using a cap worn on the head of the pet. In one embodiment, the cap has a screen or lens disposed proximate to the pet's eyes. The screen is capable of identifying an object or living thing that may be threatened by the pet, and wholly or partially obscuring the object from the vision of the pet to prevent the pet from being able to see and/or attack the object. An additional safety measure of the cap may be to completely darken or whiten the vision of the pet such that the pet is temporarily impaired from seeing anything.

Referring now to the figures, a cap is provided. The cap may be any garment that is capable of being placed on the head of an animal and/or over the eyes of the animal. Thus, the cap may be any headpiece, such as a bandana, wool hat, goggles, etc.

Figure 1:
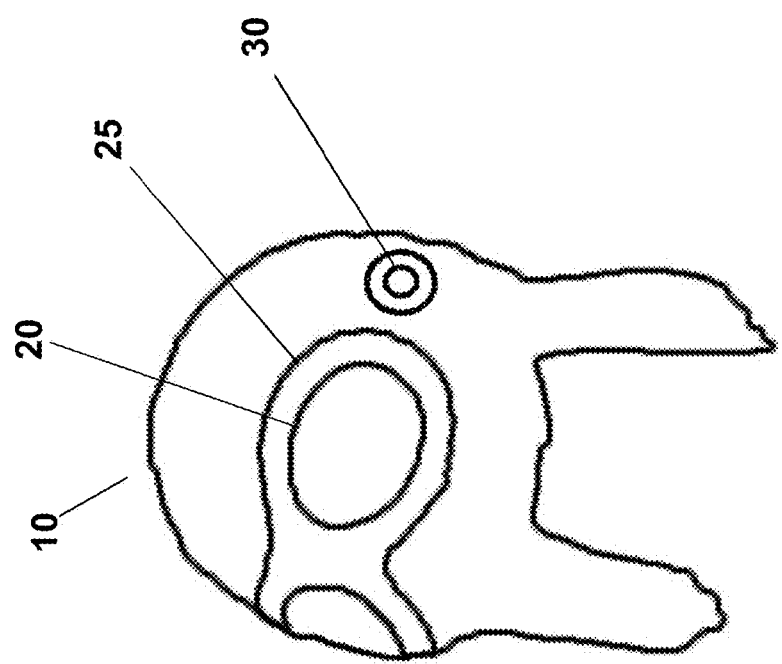
FIG. 1 is a perspective view of a pet cap according to an embodiment of the disclosed technology.

FIG. 1 is a perspective view of a pet cap according to an embodiment of the disclosed technology. The cap 10 may be formed of any type of material, such as cloth, leather, plastic, rubber, etc. The cap 10 may be rigid, semi-rigid or flexible.

The cap 10 generally has a goggle or eye-covering portion 25 that corresponds to the pets' eyes when the cap is being worn. The eye-covering portion 25 may have a lens or screen 20 through which the pet can see. The screen 20 may be transparent, translucent or opaque. In the opaque embodiment, an image is projected or displayed on the screen from camera or other sensor capturing the environment in the pet's periphery.

The screen 20 may operate in similar fashion to an optical head-mounted display ("OHMD") and/or computer. Thus, the cap 10 may have a processor, smart chip, memory, input/output, power supply, speakers and/or any other component of a computer. The smart chip may control and manipulate what is and what isn't seen on the screen 20.

Referring still to FIG. 1, an earpiece 30 may also be disposed on the portion of the cap 10 corresponding to the pet's ears. Certain sounds may be played in the earpiece 30 in an attempt to alter or influence the actions of the pet. For example, if the pet is presently posing a danger to a human directly in front of the pet, the earpiece 30 may simulate a sound of another animal or other distraction present to the sides of or behind the pet.

Figure 2:
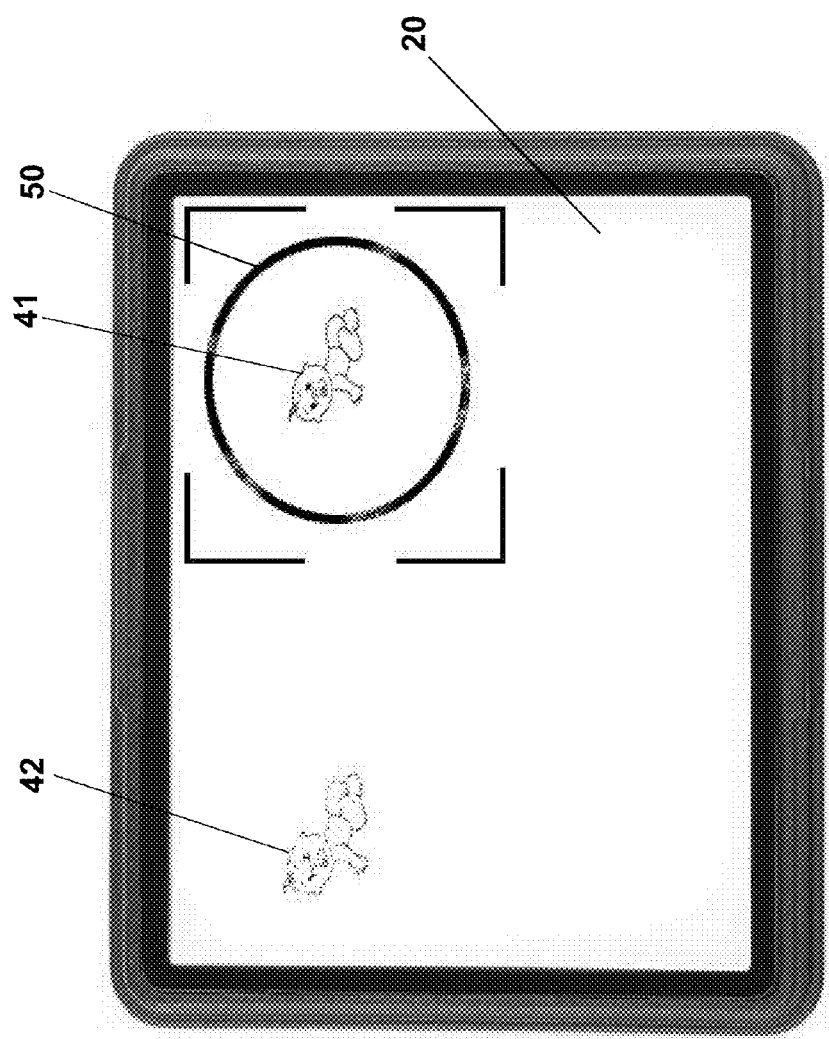
FIG. 2 is close up view of what a pet might see on a screen within the pet cap according to an embodiment of the disclosed technology.

FIG. 2 is close up view of what a pet might see on a screen within the pet cap according to an embodiment of the disclosed technology. The screen 20 may be an LCD screen, an LED screen or any other type of display. Alternatively, the screen 20 may be formed of transparent or translucent glass or plastic. The glass or plastic may be capable of displaying digital or electronic visualizations thereon. The visualizations may be interactive with the surrounding environment in similar manner to optical head-mounted displays of the prior art. A camera or other sensor (not shown) may constantly monitor and analyze the periphery of the pet.

In addition to the camera, additional sensors may monitor the movement, direction, orientation, vital information and any other data relevant to the pet's behavior. The measured information may then be used by the smart chip to make an informed decision as to whether the pet is likely to attack or is in the process of attacking a target object, such as human being or other pet.

Referring still to FIG. 2, a baby 41 is shown as the target object. The baby 41 is an example of the type of living thing or person that a pet would potentially pose a danger to. Thus, the baby 41 may be recognized and identified by the smart chip as a target object 50. As such, in the current example shown in FIG. 2, the baby 41 is identified as a potential target object 50. Thus, the smart chip operates to blur the pet's view of the baby 42. Alternatively, the smart chip may entirely block the baby from the pet's view.

Figure 3:
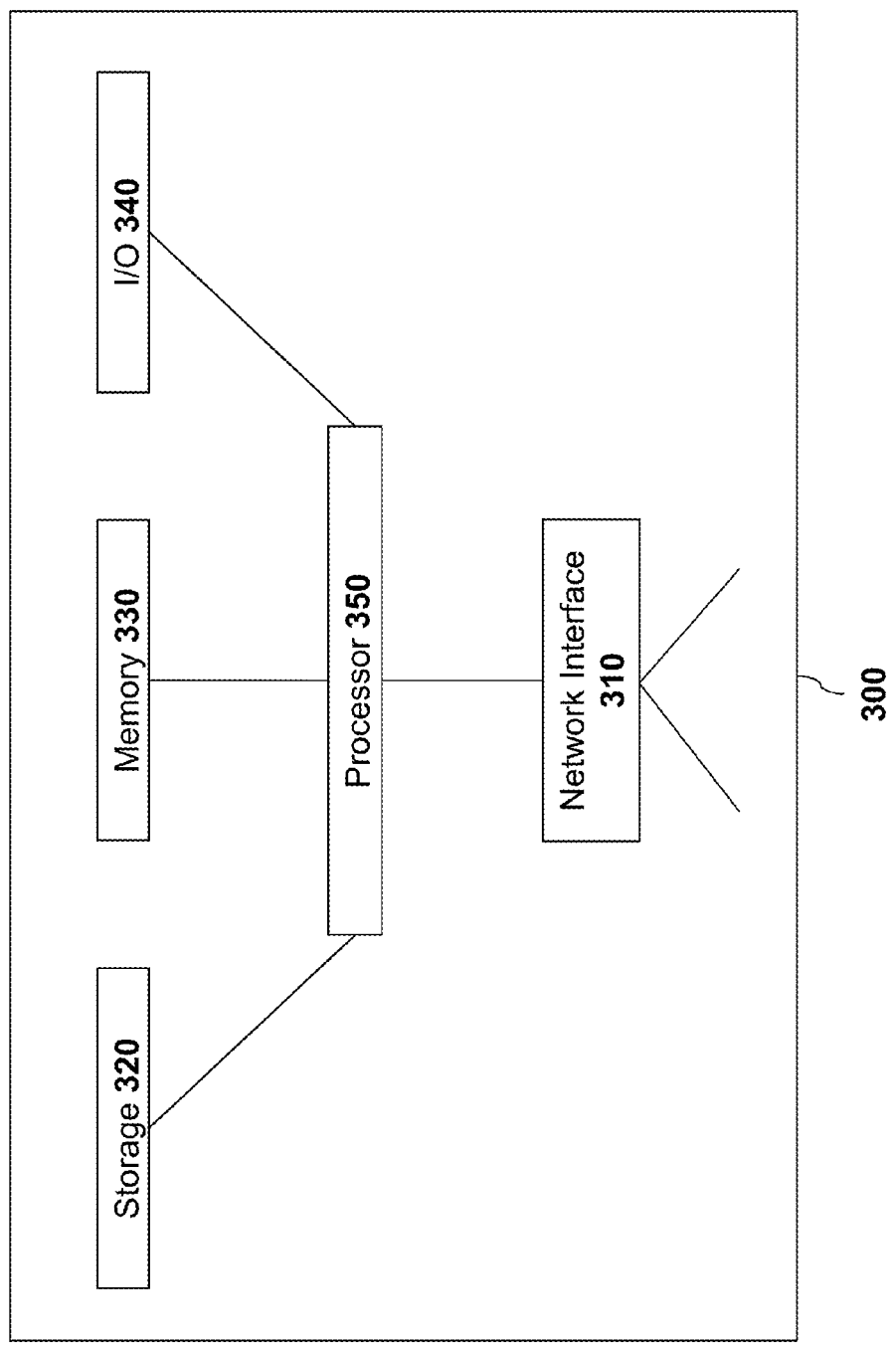
FIG. 3 is a high-level block diagram of a microprocessor device that may be used to carry out the disclosed technology.

FIG. 3 is a high-level block diagram of a microprocessor device that may be used to carry out the disclosed technology. The device 300 may or may not be a computing device. The device 300 comprises a microchip (also referred to as "a smart chip") and/or processor 350 that controls the overall operation of a computer by executing the reader's program instructions which define such operation. The device's program instructions may be stored in a storage device 320 (e.g., magnetic disk, database) and loaded into memory 330 when execution of the console's program instructions is desired. Thus, the device's operation will be defined by its program instructions stored in memory 330 and/or storage 320, and the console will be controlled by the processor 350 executing the console's program instructions.

The device 300 may also include one or a plurality of input network interfaces for communicating with other devices via a network (e.g., the internet). The device 300 further includes an electrical input interface for receiving power and data from a power or wireless data source. The device 300 may also include one or more output network interfaces 310 for communicating with other devices. The device 300 may also include input/output 340 representing devices which allow for user interaction with a computer (e.g., display, keyboard, mouse, speakers, buttons, etc.).

One skilled in the art will recognize that an implementation of an actual device will contain other components as well, and that FIG. 2 is a high level representation of some of the components of such a device for illustrative purposes. It should also be understood by one skilled in the art that the devices depicted and described with respect to FIG. 1 may be implemented on a device such as is shown in FIG. 2. Thus, the device 300 of FIG. 2 may describe the inner workings of any of the devices 110, 120, 130, 140 and/or the server on which the cloud-based system 100 is hosted.

While the disclosed invention has been taught with specific reference to the above embodiments, a person having ordinary skill in the art will recognize that changes can be made in form and detail without departing from the spirit and the scope of the invention. The described embodiments are to be considered in all respects only as illustrative and not restrictive. All changes that come within the meaning and range of equivalency of the claims are to be embraced within their scope. Combinations of any of the methods, systems, and devices described hereinabove are also contemplated and within the scope of the invention.

The invention claimed is:

1. A smart device for dogs, comprising:
    a cap adapted to be worn on a head of a dog,
    a sensor disposed on the cap for detecting a possible target object, the sensor adapted to detect the presence of another living thing in a viewable periphery of the dog, which may be deemed a target object; and
    an electronic screen disposed within a transparent eyepiece of the cap, wherein the screen:
        displays imagery located in the viewable periphery of the dog wearing the cap; and
        obscuring the target object viewed through the screen such that the target object is not clearly visible through the eyepiece, wherein the target object is deemed to be at threat of being attacked by the dog.

2. The smart device of claim 1, further comprising:
    a smart chip in the cap configured to:
        record the viewable periphery of the dog using a camera;
        determine whether the dog intends to aggressively pursue the target object by tracking movement of the dog and detecting any sudden change of speed and direction of the dog; and
        obscuring the view of the target object such that the target object is not viewable through the eyepiece.

3. The smart device of claim 2, wherein the smart chip is further configured to:
    verify if the living thing is successfully precluded from attacking the target object by detecting movement of the living thing after obscuring the target object on the screen; and
    if the living thing continues to pursue the target object, highlighting other objects that are distant from the target object to further distract the dog; and
    if the living thing still continues to pursue the target object, produce sound to direct the dog away from the target object.

4. The smart device of claim 2, wherein the camera is also used as the sensor for detecting the target object.

5. The smart device of claim 1, further comprising a function of temporarily obscuring the entire screen of the cap to prevent the dog from seeing anything at all.

6. The smart device of claim 1, wherein the obscuring is carried out using electrochromic glass incorporated into the eyepiece.

7. The smart device of claim 1, further comprising a heating element disposed in the cap for projecting heat onto the head of the dog.

8. The smart device of claim 7, further comprising a cooling element disposed in the cap for projecting heat onto the head of the dog.

9. The smart device of claim 1, wherein the sensor is a thermal imaging camera operable to detect body heat radiated from living organisms.

10. The smart device of claim 9, wherein the thermal imaging camera differentiates between species and stature of the target object based on detected temperature and size of radiated heat.

11. The smart device of claim 10, wherein the thermal imaging camera is operable to prioritize protection of babies and toddlers.

12. The smart device of claim 1, wherein the sensor is an ultrasound device.

13. The smart device of claim 1, wherein the sensor is a camera operable to detect movement.

14. The smart device of claim 1, further comprising a speaker for emitting audio into an ear of the dog.

15. A smart device for dogs, comprising:

a garment for covering at least the eyes on an animals face;

a transparent lens for particularly covering the eyes of the animal;

a heads-up display for projecting digital imagery and text on the lens;

a camera for capturing a periphery of the animal; and a smart chip for identifying and obscuring a baby, toddler or child in the periphery of the camera.

* * * * *